A. N. E. BOOS.
UNIVERSAL SERVICE PROTECTING AND RECORDING CHECK AND RECEIPT.
APPLICATION FILED JUNE 18, 1915.

1,257,795.

Patented Feb. 26, 1918.
6 SHEETS—SHEET 1.

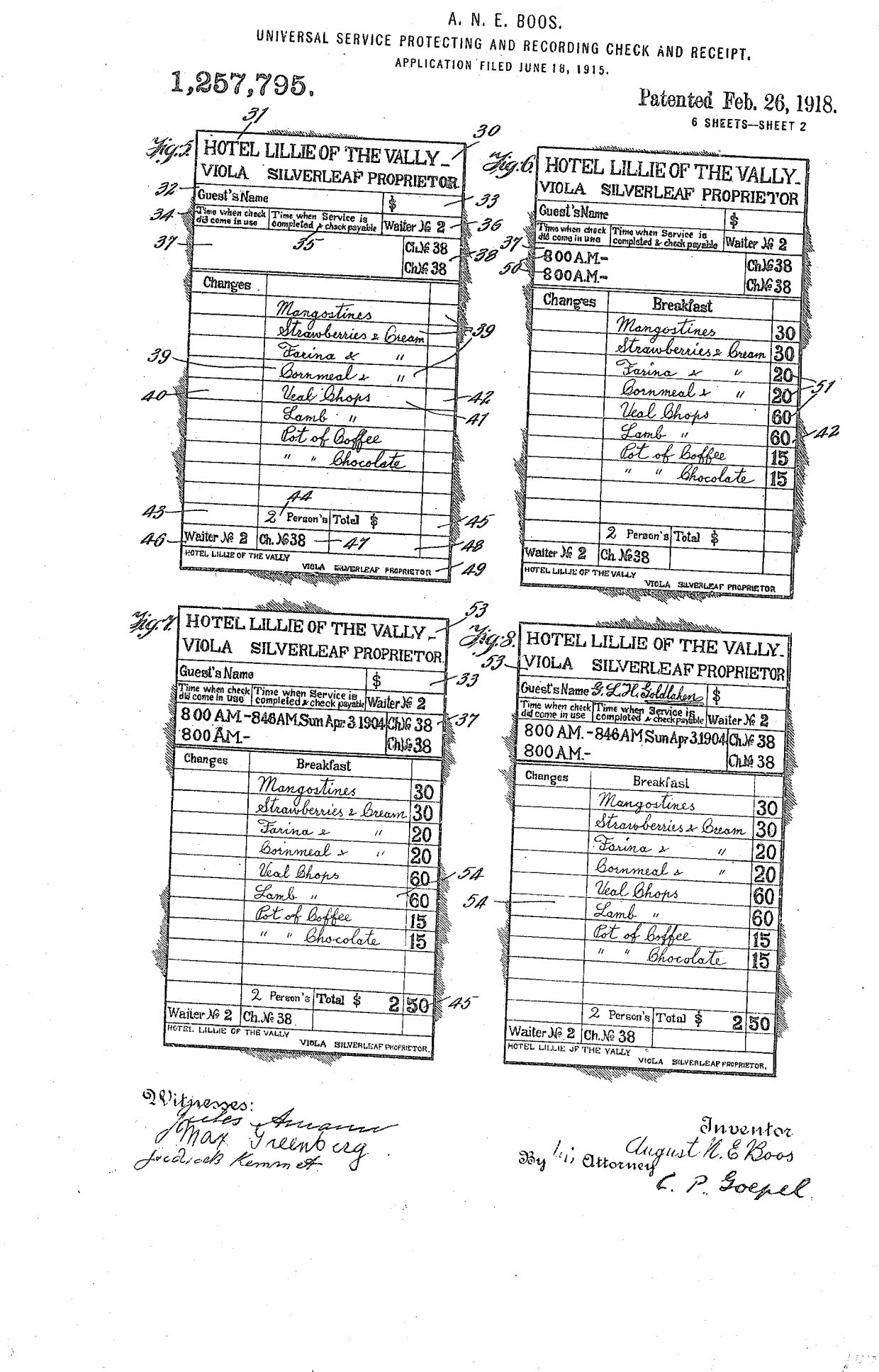

A. N. E. BOOS.
UNIVERSAL SERVICE PROTECTING AND RECORDING CHECK AND RECEIPT.
APPLICATION FILED JUNE 18, 1915.

1,257,795.

Patented Feb. 26, 1918.

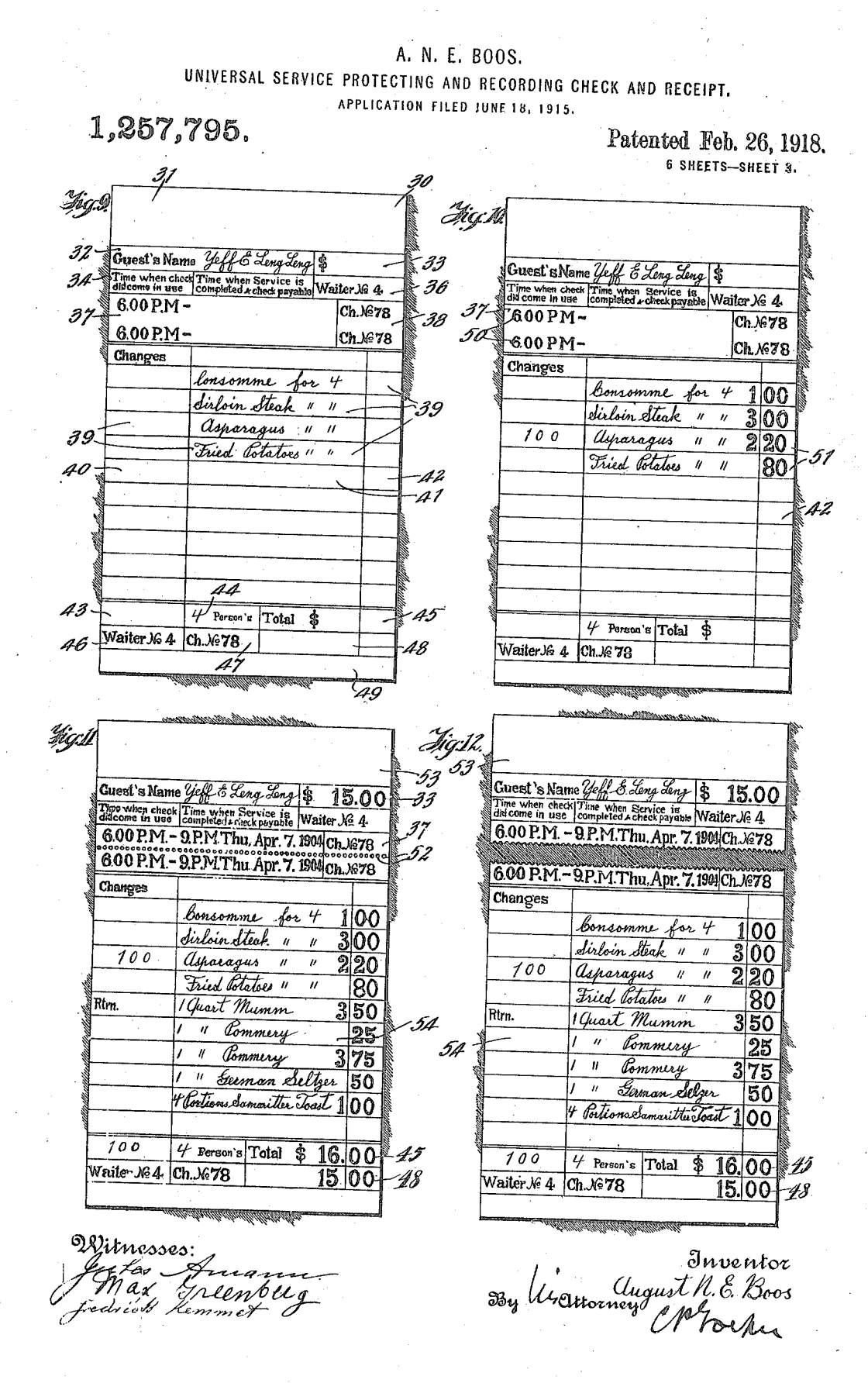

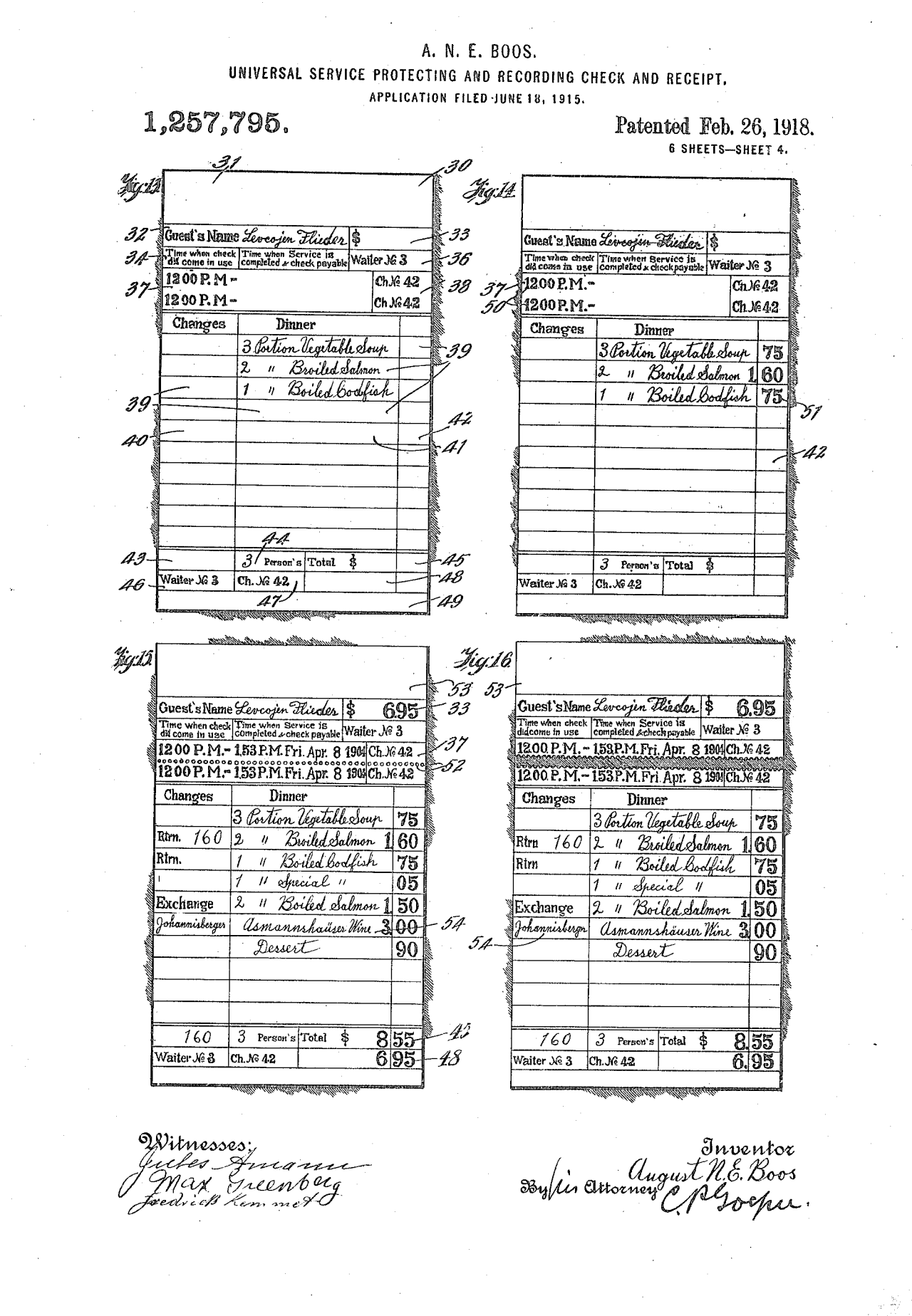

A. N. E. BOOS.
UNIVERSAL SERVICE PROTECTING AND RECORDING CHECK AND RECEIPT.
APPLICATION FILED JUNE 18, 1915.

1,257,795.

Patented Feb. 26, 1918.
6 SHEETS—SHEET 4.

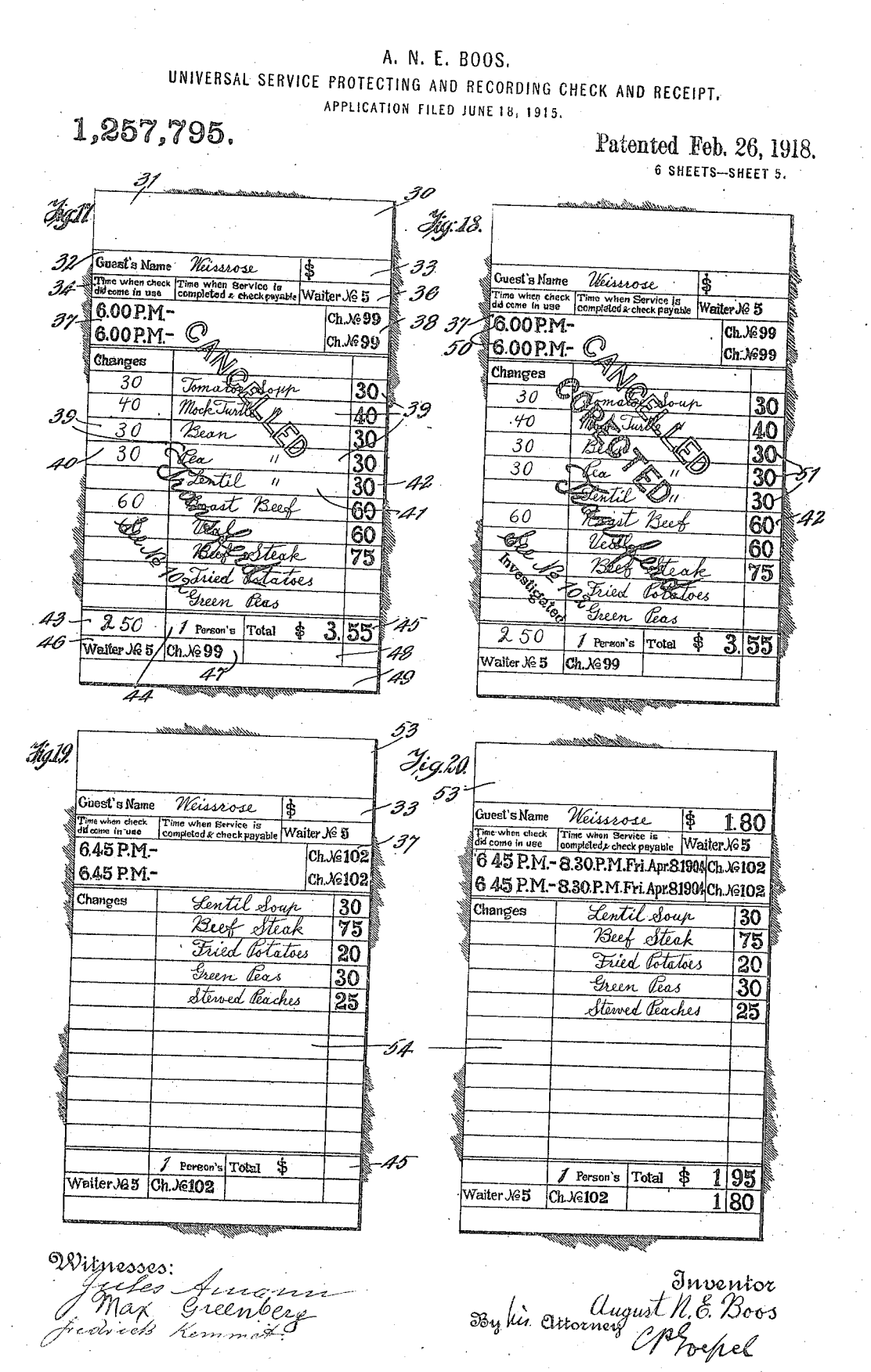

A. N. E. BOOS.
UNIVERSAL SERVICE PROTECTING AND RECORDING CHECK AND RECEIPT.
APPLICATION FILED JUNE 18, 1915.

1,257,795.

Patented Feb. 26, 1918.

| Guest's Name | Rothrose | $ | 33 | 00 |
|---|---|---|---|---|
| Time when check did come in use | Time when Service is completed & check payable | Waiter № 6 | | |
| 7.00 P.M — | Transferred to No 95 | Ch. № 94 | | |
| 7.00 P.M — | Transferred to No 95 | Ch. № 94 | | |
| Changes | | | 3 | 00 |
| | | | 3 | 00 |
| | | | 3 | 00 |
| | | | 3 | 00 |
| | | | 3 | 00 |
| | | | 3 | 00 |
| | | | 3 | 00 |
| | | | 3 | 00 |
| | | | 3 | 00 |
| | | | 3 | 00 |
| | | | 3 | 00 |
| | 12 Person's | Total | $ 33 | 00 |
| Waiter № 6 | Ch. № 94 | | | |

*Fig. 22.*

| Guest's Name | Rothrose | $ | | |
|---|---|---|---|---|
| Time when check did come in use | Time when Service is completed & check payable | Waiter № 6 | | |
| 8.00 P.M — | | Ch. № 95 | | |
| 8.00 P.M — | | Ch. № 95 | | |
| Changes | | | 3 | 00 |
| | | | 3 | 00 |
| | | | 3 | 00 |
| | | | 3 | 00 |
| | | | 3 | 00 |
| | | | 3 | 00 |
| | | | 3 | 00 |
| | | | 8 | 00 |
| | | | 5 | 00 |
| | | | 8 | 00 |
| | | | 5 | 00 |
| | 12 Person's | Total | $ 47 | 00 |
| Waiter № 6 | Ch. № 95 | | | |

*Fig. 23.*

| Guest's Name | Rothrose | $ | 80.00 |
|---|---|---|---|
| Time when check did come in use | Time when Service is completed & check payable | Waiter № 6 | |
| 8.00 P.M — | | Ch. № 95 | |
| 8.00 P.M — | | Ch. № 95 | |
| Changes | | | 3 00 |
| | | | 3 00 |
| | | | 3 00 |
| | | | 3 00 |
| | | | 3 00 |
| | | | 3 00 |
| | | | 3 00 |
| | | | 8 00 |
| | | | 5 00 |
| | | | 8 00 |
| | | | 5 00 |
| | 12 Person's | Total | $ 47 00 |
| Waiter № 6 | Ch. № 95 | 2 Checks | 80 00 |

*Fig. 24.*

| Guest's Name | Rothrose | $ | 80.00 |
|---|---|---|---|
| Time when check did come in use | Time when Service is completed & check payable | Waiter № 6 | |
| 8.00 P.M — 11.30 P.M. Mon. Apr. 11, 1904 | | Ch. № 95 | |
| 8.00 P.M — 11.30 P.M. Mon. Apr. 11, 1904 | | Ch. № 95 | |
| Changes | | | 3 00 |
| | | | 3 00 |
| | | | 3 00 |
| | | | 3 00 |
| | | | 3 00 |
| | | | 3 00 |
| | | | 3 00 |
| | | | 8 00 |
| | | | 5 00 |
| | | | 8 00 |
| | | | 5 00 |
| | 12 Person's | Total | $ 47 00 |
| Waiter № 6 | Ch. № 95 | 2 Checks | 80 00 |

Witnesses:
Jules Somayn
Max Greenberg
Frederick Kemmet

Inventor
August N. E. Boos
By his Attorney
C. P. Goepel

UNITED STATES PATENT OFFICE.

AUGUST N. E. BOOS, OF NEW YORK, N. Y.

UNIVERSAL SERVICE PROTECTING AND RECORDING CHECK AND RECEIPT.

1,257,795.  Specification of Letters Patent.  Patented Feb. 26, 1918.

Application filed June 18, 1915. Serial No. 34,783.

*To all whom it may concern:*

Be it known that I, AUGUST N. E. Boos, a citizen of the German Empire, and a resident of the borough of Manhattan, city, county, and State of New York, have invented certain new and useful Improvements in Universal Service Protecting and Recording Checks and Receipts, of which the following is a specification.

This invention relates to improvements in and relating to restaurant checks and receipts for hotels, clubs, restaurants and the like, and a system of using the same, whereby a connected record is kept of the transactions of the various departments of the institution, such for instance as the service floor, the kitchen, wine department, cigar department, service bar, store-room, bookkeeping department, etc. In such checks and systems as heretofore used, there has been much opportunity for fraud, mistakes, overcharges, etc., and it is an object of the present invention, therefore, to provide a check of this character by which a systematic record of the various purchases may be kept, the time, the day, month and year of issuance and payment of the check, the name and address of the business, the number of the waiter, and the number of the check, changes or returns in the orders, and other conditions relating to the service, may be made a permanent record, and a receipt issued to the customer which will show the date of the meal, the amount of the purchase, the number of the waiter, and the check, and so forth. A further object is to provide such a check which will be less liable to fraud as with such checks as heretofore in use, and which will greatly facilitate the service of the restaurant and the keeping of the records thereof.

With these and other objects in view, my invention is shown in the accompanying drawings, and will be hereinafter more fully described and finally pointed out in the claims.

In the drawings,

Figure 1 is a plan view of the blank check;

Fig. 2 shows the same after the order is written thereon, together with the amounts;

Fig. 3 shows the same after being totaled and ready for examination and payment by the customer, with perforations for enabling the separating of the receipt therefrom;

Fig. 4 shows the same after payment and with the customer's receipt separated therefrom;

Figs. 5 to 8 show the check used for a charge customer and unperforated;

Figs. 9 to 12 show the check as used when several persons are served and changes are made therein;

Figs. 13 to 16 show the check as used when several persons are served and when changes are made and returns made therein;

Figs. 17 to 20 show the check used where a mistake has been made and it has been necessary to cancel one check because of the great number of changes and issue a new check; and Figs. 21 to 24 show the check as used when a large number of persons are served, and it is necessary to issue more than one check to contain all the various items.

Similar reference characters indicate corresponding parts throughout the several figures of the drawings.

Referring to the drawings and more particularly to Fig. 1 thereof, the check 30 is provided at the upper end thereof with a space 31 in which is printed the name of the restaurant, the proprietor thereof, and other advertising matters as may be desired. A second space, which is divided into two parts 32 and 33, is provided beneath the said space 31, the part at the left being for the guest's name and the part at the right being for the amount of the purchase. Another division is provided beneath the said parts 32 and 33, and is divided into three spaces 34, 35 and 36, the space at the left containing the words "Time when check did come in use" or words of similar phraseology, the middle space containing the words "Time when service is completed and check payable", and the space to the right containing the words "Waiter No." and the number of the waiter. A portion 37 of the check is provided beneath the said spaces 34, 35 and 36 and is of sufficient width to have stamped thereon, twice, the time when the check comes into use and the time when the service is completed and the check payable. At the right of this portion is provided another space 38 of the same width, and in which are printed, twice, the abbreviations "Ch. No." and the number of the check. A plurality of divisions 39 are then printed on the check below the spaces 37 and 38, which are divided into three portions 40, 41 and 42. The word "Changes" is provided at the upper space 39 at the head of the portion 40. At the head of the portion 41 the name of the meal is printed as the same is to be served, and beneath the same is written the order of the guest. The amount of the order is written in the column 42. Beneath the portion 40 is provided a space 43, which is adapted to contain the total of the changes, and beneath the portions 41 and 42 are provided two spaces 44 and 45, one adapted to contain the number of persons being served, and the other the total amount purchased. A space 46 is provided beneath space 43, and which contains the words "Waiter No." and the number of the waiter. Beneath the space 44 is provided a space 47 which contains the abbreviations "Ch. No." and the number of the check, and beneath the space 45 is provided a space 48 which is adapted to contain the total purchase, if any changes are made therein. A space 49 is provided at the bottom of the check beneath the spaces 46, 47 and 48, on which is preferably printed the name of the restaurant and the proprietor.

Referring to Figs. 1 to 4, which show the check as used for a single guest, Fig. 1 shows the check with the number of the check thereon and the number of the waiter, and before the guest has given his order. The waiter then writes the name of the guest in the space 32, and after ascertaining and writing down the guest's order, he stops on his way to having the same filled, at the desk of the cashier or other person designated and has the time stamped twice in the space 37, as indicated at 50, and the amounts of the purchases placed in the column 42, as at 51. When the guest has indicated that he does not desire any further orders, the waiter again takes the check to the cashier and has the amount of the order totaled and the total amount placed in the space 45 and also in the space 33 of the receipt portion 53. In the space 37 at the right of the time of issuance of the check is stamped the time when the service is completed and the date, and at the same time a suitable instrument makes a series of perforations 52 across the center of the space 37, thereby making detachable the receipt portion 53 of the check from the body portion 54 thereof, as shown in Fig. 3. The check is then given to the guest, and after examining the same, as is customary, and indicating that no changes are desired, he severs the receipt portion 53 from the body portion and gives the waiter the correct amount, together with the said body portion. If desired the different waiters may have different colored checks, and the different departments of the restaurant employ different colored inks, which will aid in the systematization.

In Figs. 5 to 8, the check is shown as in use for more than one person, and wherein the same is to be charged against the account of the guest. The operation is similar to that shown with reference to the above described procedure, with the exception that the guest's name is not placed on the space 32 until after the meal is completed, and he has examined and verified the various purchases and the total, whereupon he signs his name in the space 32 and the check is put away as evidence of the service and for future use. Also the perforations are not made across the space 37 until the check is to be paid, whereupon the same may be placed therein and the receipt portion severed, and the same may be given as a receipt for the payment of the bill. The time of the completion of the service is only stamped once in this case at the time of the meal, and the second space is stamped when the bill is paid.

In Figs. 9 to 12, a procedure is shown wherein an error has been made in checking the amount of the order, and also wherein certain orders are brought which are not wanted or where the guest changes his mind. In Fig. 9 the waiter has placed the orders on the check and has had the time stamped thereon. After the amount of the purchases has been placed at the side of the order, it is found there is an error, the asparagus for a certain number of persons being priced at $2.20, which, however, should be $1.20, so that in the column 40 there is placed at the side of the word "Asparagus" the difference of $1.00, which is to be subtracted from the total amount of the check at the completion of the meal.

In Fig. 11 certain additions have been made to the order, and it has been found that the waiter has misunderstood the guest and has brought a quart of wine of a different brand than that desired by the guest, which is priced at $3.50. This is marked with the abbreviation "Rtrn.", indicating that the same is returned, in the changes column, as indicated at 55, and the name of the wine desired is then placed in the list of orders and the difference in the amount, which in this case is $.25 more than the wine returned, is written in the column of the amounts of the order. It will be seen that if the cost of the wine desired were less than that of the wine returned, this amount would be placed in the changes column, to be deducted from the total at the completion of the meal.

In Fig. 12, the check is shown with the receipt portion severed and with the total of $16.00 in the space 45 and the corrected total of $15.00 in the space 48.

In Figs. 13 to 16 there is shown the same procedure under slightly different circumstances. The waiter has written the orders on the check, as indicated in Fig. 13, and as he has understood and filled the order. Upon serving the order, the guest finds that the waiter has brought broiled salmon, whereas he has ordered boiled salmon, the price of the broiled salmon being $1.60 and the price of the boiled salmon being $1.50. In the changes column at the side of the order "Broiled salmon" is written the abbreviation "Rtrn.", to indicate that the same is returned, and the amount of the purchase, $1.60, which is to be deducted from the total, and in the changes column at the side of the order "Boiled salmon" is written the word "Exchange." Also one of the others of the party has found that the waiter has brought one portion of boiled codfish whereas he has ordered a portion of special codfish. The difference in the cost of the same being $.05, the amount $.75 of the boiled codfish is placed at the right of this order, and the amount $.05 is placed at the right of the special codfish order, thereby making the amount of the transaction a total of $.80, the exact cost of the special codfish. The total of the bill $8.55 is placed in the space 45, and the corrected total $6.95 is placed in the space 48.

In Figs. 17 to 20, the procedure is shown wherein it has been necessary to cancel one check and issue another therefor. The waiter in this case has had so many return orders that he could not place more orders on the check, so that the first check issued is stamped "Cancelled" and underneath the same is written the word "Transferred" and the words "See No." and the number of the new check issued. As the checks are later gone over by the bookkeeping or controlling department and such canceled checks appear, the records are correspondingly corrected and the checks are stamped "Corrected," and the cause of the mistakes is then investigated, and thereupon the word "Investigated" is stamped upon the check. The new check brought in use and shown in Fig. 19 has stamped thereon the time of issuance of the same, which is also the time of canceling the first issued check. In this way, should any mistake be made in the total the same may be readily traced back.

Where a large number of persons are served, and one check is not sufficient to contain all of the orders, a single check is first made out in the usual order, and upon filling up, the same is totaled, and the orders are continued on a second check, and if necessary, on a third check and so forth. The total of all the checks is then placed on the last check, as shown in Fig. 23, and the words "Transferred to No." and the number indicating the last check, are placed on the first check, and when the meal is completed and the check paid, the receipt of the last check which has been perforated is given to the member of the party paying the same.

With the use of my improved check, it will be seen that a very complete record of all of the purchases made and changes and returns therein are very accurately kept, and at the same time a receipt is provided for the guest, both the receipt for the guest and the check for the restaurant containing the time and date of issuance of the check and the time of the completion of the meal.

I have illustrated a very satisfactory form of my invention, but it is obvious that changes may be made therein within the spirit and scope thereof, as defined in the appended claims.

I claim:—

1. A service check for restaurants and the like comprising a ticket and a coupon, the coupon bearing printed matter constituting a guest's receipt portion and ticket bearing printed matter constituting a waiter's check, the adjacent portions of the ticket and coupon being appropriately designated to receive duplicate marks one above the other indicating the time of beginning and completing a certain service, the adjacent portions of said ticket and coupon permitting the simultaneous entry of said duplicate marks, a check number and a waiter's identifying number on the guest's receipt portion and on the waiter's check portion respectively, spaces appropriately designated for the entry of items on the waiter's check portion and spaces appropriately designated for the entry of the total on said guest's receipt portion and waiter's check portion respectively.

2. A service check for restaurants and the like comprising a ticket and a coupon, said ticket and coupon having an indicated line of separation therebetween, the coupon bearing printed matter constituting a guest's receipt portion and ticket bearing printed matter constituting a waiter's check, the adjacent portions of the ticket and coupon being appropriately designated to receive duplicate marks one above the other indicating the time of beginning and completing a certain service, the adjacent portions of said ticket and coupon permitting the simultaneous entry of said duplicate marks, a check number and a waiter's identifying number on the guest's receipt portion and on the waiter's check portion respectively, spaces appropriately designated for the entry of items on the waiter's check portion and spaces appropriately designed for the entry of the total on said guest's receipt portion and waiter's check portion respectively.

In testimony that I claim the foregoing as my invention, I have signed my name in presence of two subscribing witnesses.

AUGUST N. E. BOOS.

Witnesses:
Jos. Bisbano,
D. Lewis Mattern.

Copies of this patent may be obtained for five cents each, by addressing the "Commissioner of Patents, Washington, D. C."